United States Patent
Feldman et al.

(10) Patent No.: US 8,620,752 B2
(45) Date of Patent: Dec. 31, 2013

(54) ADVERTISEMENT ALLOCATION

(75) Inventors: Jon Feldman, New York, NY (US);
Seyed Vahab Mirrokni Banadaki, Brooklyn, NY (US);
Shanmugavelayutham Muthukrishnan, New York, NY (US);
Aranyak Mehta, Mountain View, CA (US)

(73) Assignee: Google Inc., Mountain View, CA (US)

( * ) Notice: Subject to any disclaimer, the term of this patent is extended or adjusted under 35 U.S.C. 154(b) by 799 days.

(21) Appl. No.: 12/605,813

(22) Filed: Oct. 26, 2009

(65) Prior Publication Data
US 2010/0299215 A1 Nov. 25, 2010

Related U.S. Application Data

(60) Provisional application No. 61/180,585, filed on May 22, 2003.

(51) Int. Cl.
G06Q 30/00 (2012.01)

(52) U.S. Cl.
USPC .................. 705/14.72; 705/14.43; 705/14.46

(58) Field of Classification Search
USPC .......................................... 705/14.43, 14.46
See application file for complete search history.

(56) References Cited

U.S. PATENT DOCUMENTS

| | | | |
|---|---|---|---|
| 7,130,808 B1 | 10/2006 | Ranka et al. | |
| 7,406,434 B1 | 7/2008 | Chang et al. | |
| 7,415,423 B2 | 8/2008 | Ranka et al. | |
| 2008/0281627 A1 | 11/2008 | Chang et al. | |
| 2008/0306810 A1 | 12/2008 | Ranka et al. | |
| 2011/0078014 A1 | 3/2011 | Feldman et al. | |
| 2011/0270674 A1* | 11/2011 | Cosman | 705/14.45 |

OTHER PUBLICATIONS

Alaei S. and Malekian A. Maximizing sequence-submodular functions. Conference Presentation Abstract. [online], [Retrieved on: Nov. 4, 2009]. Retrieved from the Internet: <http://biblio.informs.org/showConfRecord.php?id=53236>.

Andelman N. and Mansour Y. Auctions with Budget Constraints*. In 9th *Scandinavian Workshop on Algorithm Theory* (SWAT), pp. 26-38, 2004.

Azar Y. et al. Improved Approximation Algorithms for Budgeted Allocations*. In *Proceedings of the 35th international colloquium on Automata, Languages and Programming, Part I*, pp. 186-197. Springer-Verlag Berlin, Heidelberg, 2008.

Azar, Y., et al. Balanced Allocations*. *Siam J. Comput.*, 29(1):180-200, 1999.

Bertsekas P. and Castanon D. A.. Rollout Algorithms for Stochastic Scheduling Problems. *J of Heuristics*, 5(1):89-108, 1999.

(Continued)

*Primary Examiner* — William A Brandenburg
(74) *Attorney, Agent, or Firm* — Leason Ellis LLP

(57) ABSTRACT

Systems and methods for allocating and providing advertisements in response to impression events (e.g., a request for a placement of an advertisement) corresponding to forecasted impressions (e.g., a forecast of a request for a placement of an advertisement). The advertisements are allocated according to solution data that includes two disjoint solution sets, with each solution set identifying an advertisement that can be allocated to a forecasted impression.

23 Claims, 7 Drawing Sheets

(56) References Cited

OTHER PUBLICATIONS

Buchbinder N., et al. Online Primal-Dual Algorithms for Maximizing Ad-Auctions Revenue. In *Algorithms-ESA 2007 15th Annual European Symposium*, Eilat, Israel, Oct. 8-10, 2007: Proceedings, p. 253. Springer, 2007.

Chakrabart D. and Goel G. On the Approximability of Budgeted Allocations and Improved Lower Bounds for Submodular Welfare Maximization and GAP. In *Proceedings of the 2008 49th Annual IEEE Symposium on Foundations of Computer Science—vol. 00*, pp. 687-696. IEEE Computer Society Washington, DC, USA, 2008.

Pucci de Farias, D. and Van Roy, B. On Constraint Sampling in the Linear Programming Approach to Approximate Dynamic Programming. *Math. Oper. Res.*, 29(3):462-478, 2004.

Farias V.F. and Van Roy, B. Approximation algorithms for dynamic resource allocation. *Oper. Res. Lett.*, 34(2):180-190, 2006.

Garg N. et al. Stochastic Analyses for Online Combinatorial Optimization Problems. In *SODA*, pp. 942-951, 2008.

Goel, G. and Mehta A. Adwords Auctions with Decreasing Valuation Bids. In *WINE*, pp. 335-340, 2007.

Goel G. and Mehta A. Online Budgeted Matching in Random Input Models with applications to Adwords. In *SODA*, pp. 982-991, 2008.

Grandoni F. et al. Set Covering with Our Eyes Closed. 2008 9th Annual Symposium on Foundations of Computer Science (*FOCS*), pp. 347-356, 2008.

Karp R.M. et al. An Optimal Algorithm for On-line Bipartite Matching. In *Proceedings of the 22nd Annual ACM Symposium on Theory of Computing*, 1990.

Mahdian M. et al. Allocating Online Advertisement Space with Unreliable Estimates. In ACM *Conference on Electronic Commerce*, pp. 288-294, 2007.

Mehta A. et al. Adwords and Generalized On-line Matching. Proceedings of the 2005 46th Annual IEEE Symposium on Foundations of Computer Science (*FOCS*), (10 pages) 2005.

Mitzenmacher M. The power of Two Choices in Randomized Load Balancing. *IEEE Trans. Parallel Distrib. Syst.*, 12(10):1094-1104, 2001.

Srinivasan A. Budgeted Allocations in the Full-Information Setting. In *Approximations, Randomization, and Combinatorial Optimization. Algorithms and Techniques: 11th International Workshop, Approx 2008 and 12 International Workshop*, Random 2008, Boston, Ma., USA, Aug. 25-27, 2008, pp. 247-253. Springer, 2008.

Wang and Xia. "Analysis and Design of Primal-Dual Assignment Networks." IEEE Transactions on Neural Networks, 9(1): pp. 183-194, Jan. 1998.

Agrawal et al. A dynamic near-optimal algorithm for online linear programming. Working paper posted at http://www.stanford.edu/yyye/. 2009, 21 pages.

A. Asadpour and A. Saberi. An approximation algorithm for max-min fair allocation of indivisible goods. In STOC, pp. 114-121, 2007.

Awerbuch et al. Throughput-competitive on-line routing. In FOCS, vol. 34, 1993, 11 pages.

Babaioff et al. Online auctions and generalized secretary problems. SIGecom Exchanges, 7(2), 2008, 11 pages.

N. Bansal and M. Sviridenko. The santa claus problem. In STOC, pp. 31-40, 2006.

Bateni et al. Maxmin allocation via degree lower-bounded arborescences. In STOC, 2009, pp. 543-552.

Broder et al. Online expansion of rare queries for sponsored search. In WWW, 2009, 10 pages.

Broder et al. A semantic approach to contextual advertising. In SIGIR, pp. 559-566, 2007.

N. Buchbinder and J. Naor. Improved bounds for online routing and packing via a primal-dual approach. In FOCS, 2006, 10 pages.

Chakrabarty et al. On allocating goods to maximize fairness. In FOCS, 2009, 10 pages.

Chawla et al. Multi-parameter mechanism design and sequential posted pricing. STOC, 2010, 12 pages.

Chierichetti et al. Similarity caching. In PODS, pp. 127-135, 2009.

N. Devanur and T. Hayes. The adwords problem: Online keyword matching with budgeted bidders under random permutations. In ACM EC, 2009, 8 pages.

Feldman et al. Online ad assignment with free disposal. In WINE, 2009, 12 pages.

Feldman et al. Online Stochastic Ad Allocation: Efficiency and Fairness, Jan. 27, 2010, 18 pages.

Feldman et al. Online stochastic matching: Beating 1-1/e. In FOCS, 2009, 12 pages.

Feldman et al. Online Stochastic Packing applied to Display Ad Allocation, Feb. 17, 2010, 19 pages.

Ghosh et al. Bidding for representative allocations for display advertising. In WINE, pp. 208-219, 2009.

Ghosh et al. Adaptive bidding for display advertising. In WWW, pp. 251-260, 2009.

Goel et al. Combining fairness with throughput: online routing with multiple objectives. In STOC, pp. 670-679, 2000.

Kleinberg et al. Fairness in routing and load balancing. J. Comput. Syst. Sci., 63(1):2-20, 2001.

R. Kleinberg. A multiple-choice secretary algorithm with applications to online auctions. In Proceedings of the sixteenth annual ACM-SIAM symposium on Discrete algorithms, pp. 630-631. Society for Industrial and Applied Mathematics, 2005.

N. Korula and M. Pal. Algorithms for secretary problems on graphs and hypergraphs. In ICALP, 2009, 15 pages.

Kumar and J. M. Kleinberg. Fairness measures for resource allocation. SIAM J. Comput., 36(3):657-680, 2006.

Lipton et al. On approximately fair allocations of indivisible goods. In ACM EC, 2004, pp. 125-131.

Pandey et al. Nearest-neighbor caching for content-match applications. In WWW, pp. 441-450, 2009.

PricewaterhouseCoopers and the Interactive Advertising Bureau. IAB Internet advertising revenue report, 2009. http://www.docstoc.com/docs/5134258/IAB-2008-Report, 21 pages.

Vee et al. Optimal Online Assignment with Forecasts, Electronic Commerce 2010, Jun. 7-11, 2010, 10 pages.

A. Vetta. Nash equilibria in competitive societies, with applications to facility location, traffic routing and auctions. In FOCS, 2002, 10 pages.

\* cited by examiner

ADVERTISEMENT ALLOCATION

CROSS-REFERENCED TO RELATED APPLICATIONS

This application claims the benefit under 35 U.S.C. §119 (e) of U.S. Patent Application No. 61/180,585, titled "ADVERTISEMENT ALLOCATION," filed May 22, 2009, which is incorporated herein by reference.

BACKGROUND

This disclosure relates to online advertising.

Advertisement delivery providers facilitate the presentation of advertisements from numerous advertisers on network resources (e.g., web pages). In general, an advertisement delivery provider routinely services the same network resources. Thus the advertisement delivery provider is aware of the advertisement traffic on those network resources. Advertisement delivery providers can utilize known advertisement traffic data to forecast advertisement traffic (e.g., demand for advertisements) on the network resources for a future time period.

SUMMARY

In general, the subject matter of this specification relates to systems and methods for allocating advertisements. One aspect of the subject matter described in this specification can be embodied in a method including identifying forecasting data defining forecasted impressions for a given time period; identifying advertisements available to be provided during the time period; generating solution data having a first solution set for associating the advertisements with the forecasted impressions and a second solution set for associating the advertisements with the forecasted impressions, the first and second solution sets are disjoint solution sets where the first and second solution sets do not have any common advertisement and forecasted impression associations; for each of the forecasted impressions, identifying a first advertisement associated with the forecasted impression from the first solution set and a second advertisement associated with the forecasted impression from second solution set; and providing the first advertisement or second advertisement for an associated forecasted impression in response to an impression event corresponding to the associated forecasted impression. Other embodiments of this aspect include corresponding systems, apparatus, and computer program products.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, the subject matter of this specification relates to allocating advertisements to forecasted impressions according to solution data that include sets of allocation solutions that are disjoint to each other. A forecasted impression is a forecast of an impression event during a future time period. Thus the solution data can be used to determine or guide the decisions as to which advertisements to allocate to impression events, corresponding to the forecasted impressions, as the impression events occur during the future time period. For example, the solution data may include two solution sets. As such, for each forecasted impression, the solution data provide two advertisements that can be allocated to (selectable for) the forecasted impression—one advertisement from a first solution set and one advertisement allocated from a second solution set. Generally, the allocation of the advertisement from the first solution set is used to select an advertisement in response to a corresponding impression event. However, if the advertisement has already been selected for a previous impression event, then the allocation of the advertisement from the second solution set can be used to select an advertisement for the impression event.

The solution data are generated from forecasting data and advertisement availability data, and, as described above, is used to allocate advertisements to impression events. An impression event is a request for an advertisement for a particular network resource. The forecasting data specify forecasts of impression events during a future time period. For example, the forecasting data may indicate that network resource A and network resource B will each request an advertisement during a future time period.

The advertisement availability data are a known set of advertisements available to be presented during a future time period. The advertisement availability data can be determined from advertisement sales contracts for the future time period, and/or projected from historical advertisement availability information. The advertisement availability data can include advertiser requirements concerning advertisement placements only on certain network resources, or to certain users or demographics, etc. For example, a particular sports web site may provide, on average, 10,000 impressions a week, and an advertiser may purchase 1,000 of the impressions over a one-week period.

Figure 1:
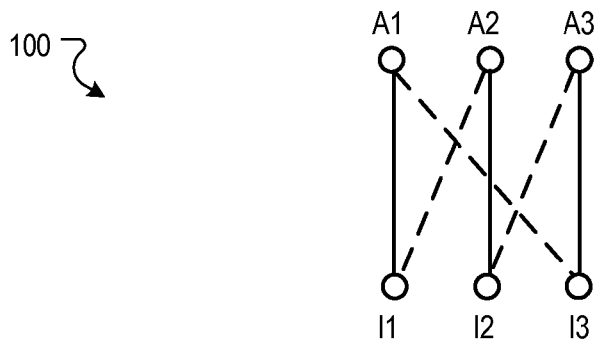
FIG. 1 is an example graph representing solution data for allocating advertisements to forecasted impressions.

FIG. 1 is an example graph representing solution data for allocating advertisements to forecasted impressions. For simplicity, only three impressions and advertisements are represented; however, the graph may, in practice, include thousands or even hundreds of thousands of advertisements and impressions. A1, A2, and A3 are advertisements identified from the advertisement availability data. I1, I2, and I3 are forecasted impressions identified from the forecasted impression data.

As noted above, the solution data include sets of solutions for allocating (associating) advertisements to the forecasted impressions. A solution set is a collection of solutions for allocating advertisements to forecasted impressions. More particularly, each solution set allocates one advertisement to one forecasted impression. Such an allocation requires that a forecasted impression is associated with only one advertisement and that the advertisement is allocated only to the forecasted impression. This relationship is referred to as an advertisement and forecasted impression association. For example, the solution data represented in FIG. 1 include a first solution set indicated by solid lines and a second solution set indicated by dashed lines. The first solution set includes the advertisement and forecasted impression associations of (I1 and A1), (I2 and A2) and (I3 and A3), and the second solution set includes the advertisement and forecasted impression associations of (I1 and A2), (I2 and A3) and (I3 and A1).

The solution sets included in the solution data are disjoint solution sets. As used herein, disjoint solution sets are solution sets that do not have any common advertisement and forecasted impression associations. For example, the first and second solution sets of graph 100 are disjoint solution sets because they do not share any common advertisement and forecasted impression associations. Conversely, for example, if a solution set includes the advertisement and forecasted impression associations of (I1 and A1), (I2 and A2) and (I3 and A3) and another solution set includes the advertisement and forecasted impression associations of (I1 and A2), (I2 and A1) and (I3 and A3), then these solution sets are not disjoint solution sets because they share (I3 and A3).

Thus for a group of forecasted impressions and corresponding available advertisements, solution data having two solution sets includes two advertisements that can be allocated to each forecasted impression—an allocation of an advertisement from the first solution set and an allocation of an advertisement from the second solution set. For example, as shown in graph 100, advertisement A1 (from the first solution set) and advertisement A2 (from the second solution set) can be allocated to the forecasted impression I1.

Once an advertisement is allocated for an impression, all associations for that advertisement are removed from the solution sets. For example, if A1 is selected for I1 (from the first solution set), the advertisement and forecasted impression associations A1 and I1 and A1 and I3 are removed from the solution sets.

For exemplary purposes, assume the goal is to allocate an advertisement to only one forecasted impression and to maximize the number of forecasted impressions to which an advertisement is allocated. Selecting from among two advertisement allocation options from two disjoint solution sets as described above can, for example, increase the number of forecasted impressions that are satisfied by the placement of advertisements, which can, in turn, provide an optimum advertisement allocation.

§1.0 Example Operating Environment

Figure 2:
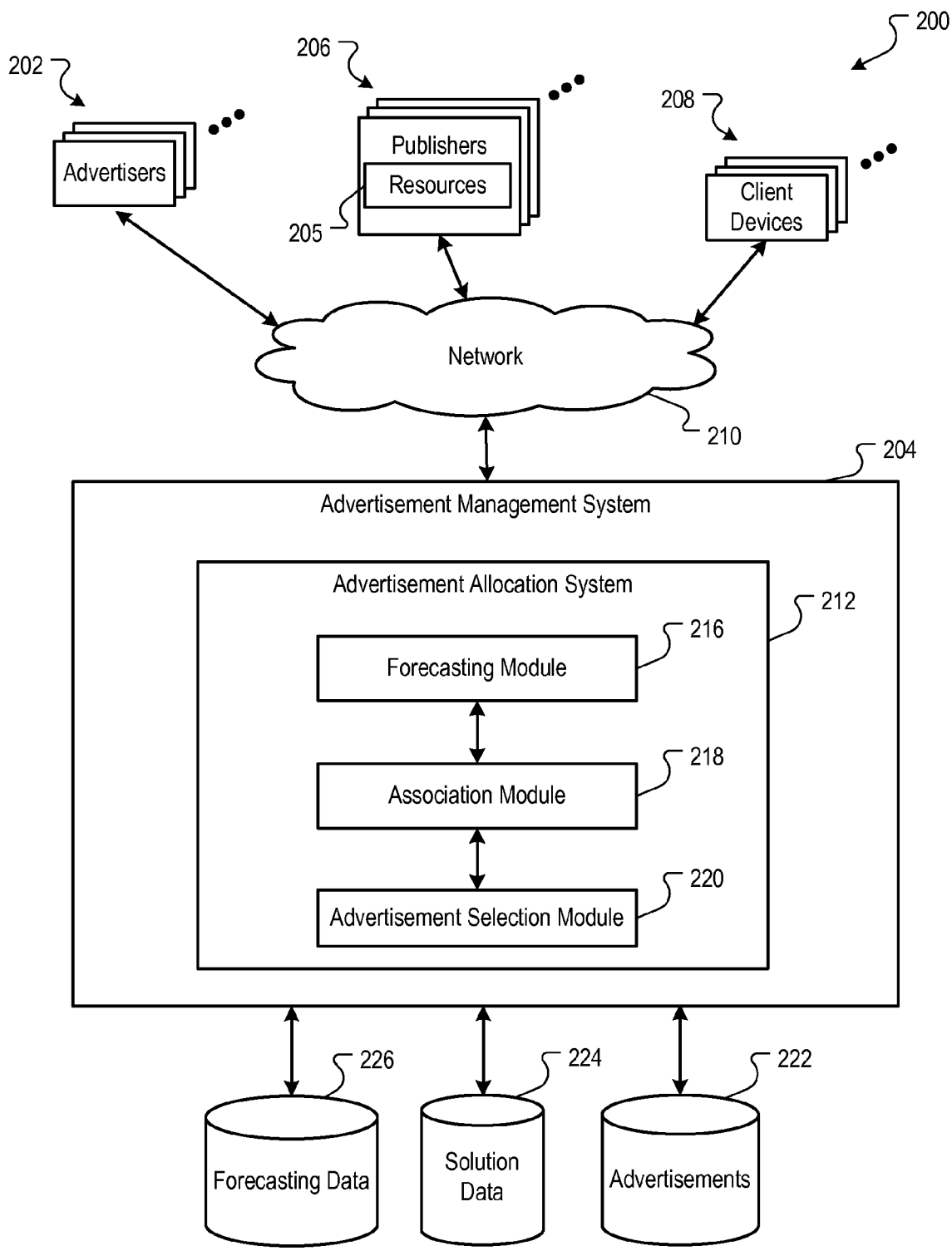
FIG. 2 is a block diagram of an example environment in which an advertisement allocation system can be implemented.

FIG. 2 is a block diagram of an example environment 200 in which an advertisement allocation system 212 can be implemented. The online environment 200 can facilitate the identification and serving of web content, e.g., web pages, advertisements, etc., to users. A computer network 210, such as a local area network (LAN), wide area network (WAN), the Internet, or a combination thereof, connects advertisers 202, an advertisement management system 204, web sites 206, and client devices 208. The online environment 200 may include numerous advertisers 202, web sites 206 and client devices 208.

One or more advertisers 202 can directly, or indirectly, enter, maintain, and track advertisement information in the advertising management system 204. The advertisements can be in the form of graphical advertisements, such as banner advertisements, text only advertisements, image advertisements, audio advertisements, and video advertisements.

A web site 206 is a one or more web page resources 205 associated with a domain name, and each web site is hosted by one or more servers. An example web site is a collection of web pages formatted in hypertext markup language (HTML) that can contain text, graphic images, multimedia content, and programming elements, such as scripts. Each web site 206 is maintained by a publisher, e.g., an entity that manages and/or owns the web site. For brevity, the term "publisher" will also be used to refer to a web site 206 that is managed and/or owned by the publisher.

A client device 208 is an electronic device that is under the control of a user and is capable of requesting and receiving data over the network 210. A client device 208 typically includes a user application, such as a web browser, to facilitate the sending and receiving of data over the network 210, such as requesting a resource (e.g., page content) from a publisher 206. Example client devices 208 include personal computers, mobile communication devices, and other devices that can send and receive data over the network 210.

The system 204 can facilitate an auction to determine which advertisements are to be selected and provided to requesting publishers 206. However, in some advertisement schemes, the advertisers 202 contract with an advertisement delivery provider and/or publishers 206 to set a predetermined number of impression events that their advertisements are to satisfy (e.g., a number of impressions the advertisers desire for their advertisements). Often the advertisers 202 also provide instruction as to which network resources or group or category of network resources their advertisements are to be placed, and/or to which users or user demographics their advertisements are to be presented ("advertisement availability data"). The advertisement availability data can be determined from advertisement sales contracts for a future time period, and/or projected from historical advertisement availability information. As some publishers 206 contract with advertisers, the publishers may also have access to advertisement availability data.

§2.0 Advertisement Allocation System

The advertisement management system 204 includes an advertisement allocation system 212. The advertisement allocation system 212 allocates and provides advertisements in response to impression events corresponding to forecasted impressions based on forecasting data and advertisement availability data. The advertisement allocation system 212 includes a forecasting module 216, an association module 218 and an advertisement selection module 220. The operation of the forecasting module 216, the association module 218, and the advertisement selection module 220 is explained below with reference to FIG. 3.

§2.1 Exemplary Process for Allocating Advertisements

Figure 3:
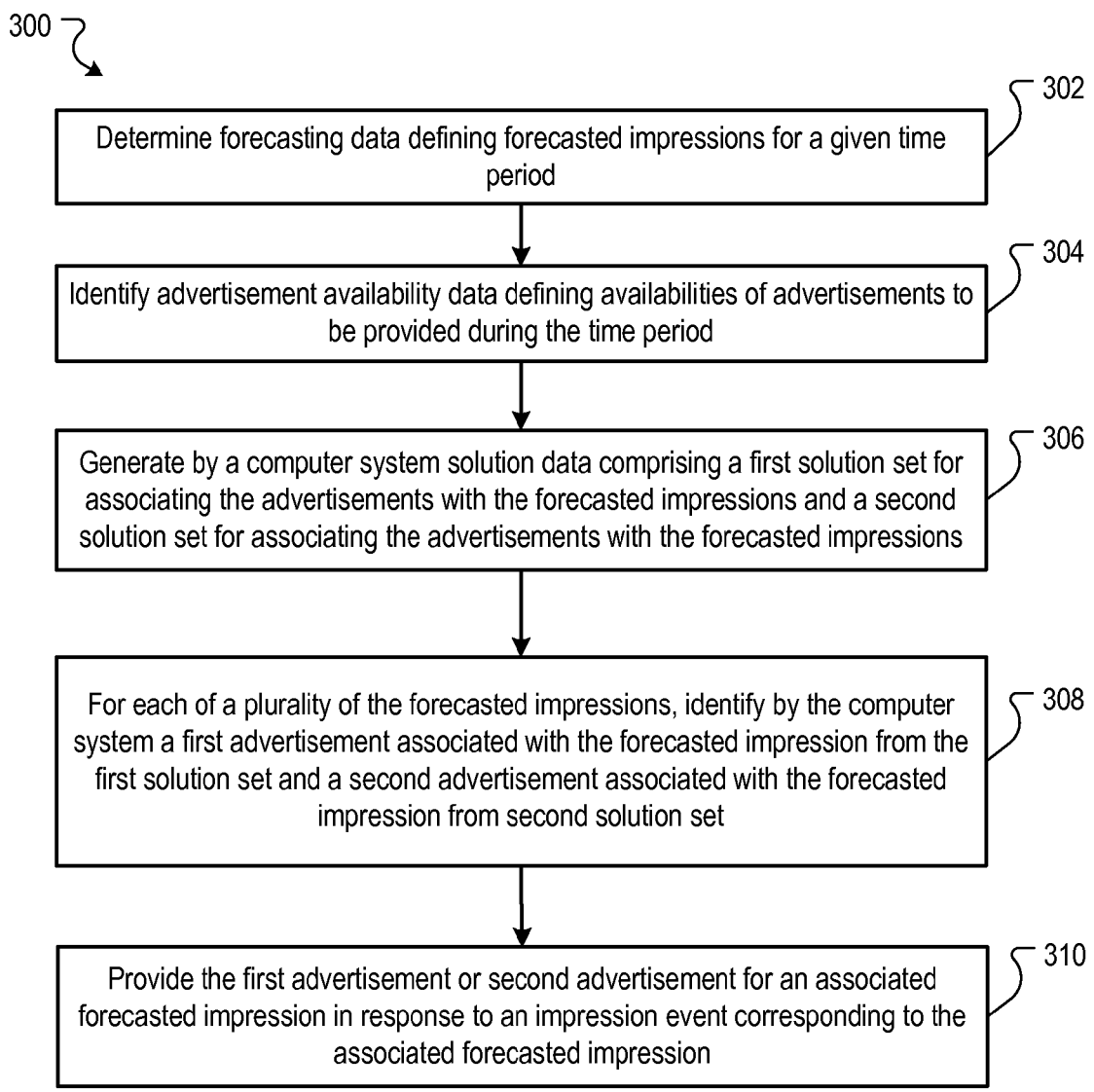
FIG. 3 is a flow diagram of an example process for providing advertisements in response to impression events based on forecasting data and advertisement availability data.

FIG. 3 is a flow diagram of an example process for providing advertisements in response to impression events based on forecasting data and advertisement availability data.

Forecasting data defining forecasted impressions for a given time period are determined (302). Forecasted impressions are forecasts of requests from particular network resources for placement of advertisements on those network resources. The forecasting data 226 can be derived from past advertisement traffic for those network resources. In some implementations, the forecasting data 226 can be provided to the forecasting module 216. In other implementations, the forecasting data 226 can be generated by the forecasting module 216. A variety of forecasting methods and algorithms can be used to generate the forecasting data 226.

Advertisement availability data defining availabilities of advertisements to be provided during the time period are identified (304). The advertisement availability data can include information from advertisers regarding the number of advertisement impressions purchased for particular network resources, restrictions/requirements for placement of advertisements on particular network resources, restrictions/requirements for presentation of the advertisements to particular users or groups of users (e.g., based on user demographics), or other restrictions on how advertisements are to be placed or presented.

Figure 4:
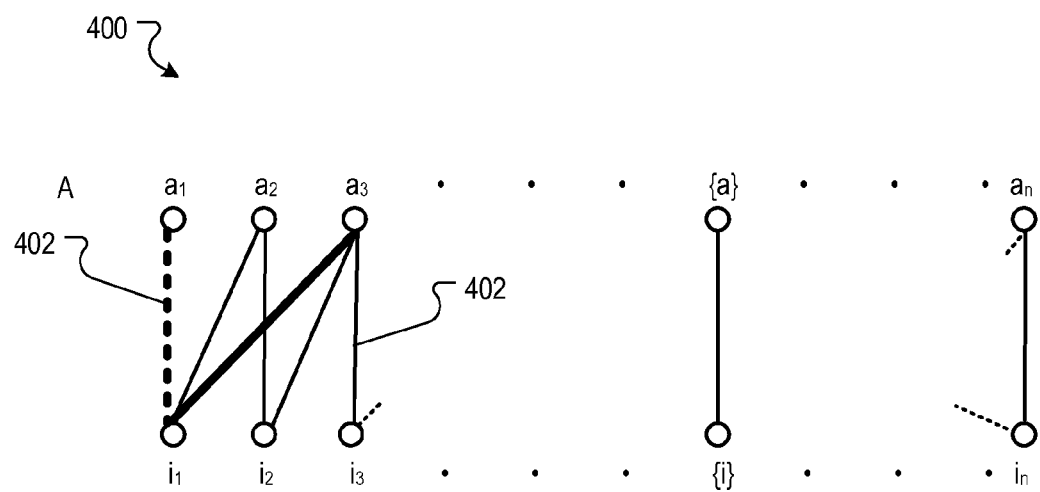
FIG. 4 is an example graph relating advertisements to forecasted impressions.

However, publishers may also limit the types of advertisements that may be placed on their network resources. Such publisher limitations can also be reflected in the advertisement availability data. For example, the forecasting module 216 can receive and/or identify the advertisement availability data from the advertising data store 222. The relationship between advertisements and their availability (e.g., the restrictions/requirements associated with the advertisements or the publishers) and the forecasted impressions can be represented, for example, by a graph, as shown in FIG. 4, which is an example graph 400 relating advertisements to forecasted impressions.

The forecasting data and advertisement availability data may be used by the association module 218 to generate a graph 400 relating forecasted impressions to advertisements that are allowed to be allocated to those forecasted impressions. For example, the allocations can be represented in the graph 400 as edges 402 between forecasted impressions (e.g., $i_1, i_2, i_3 \ldots i_n$) and advertisements (e.g., $a_1, a_2, a_3 \ldots a_n$). Each edge 402 between an advertisement and a forecasted impression is an allowable allocation based on, for example, advertiser requirements/restrictions from the advertisement availability data. For example, advertisement $a_3$ shares edges with $i_1, i_2$ and $i_3$, so $a_3$ could be allocated to $i_1, i_2$ or $i_3$. Further, $a_1$ is only permitted to be allocated to $i_1$.

As explained above, a forecasted impression is a forecast of a request for a particular network resource for placement of an advertisement on the network resource. It will often be the case that multiple placements for advertisements during a time period will be requested for the network resource. For example, network resource A may be accessed by hundreds of different users during a given time period and for each user the network resource may request placement of one or more advertisements. Multiple forecasted impressions for the same network resource can be represented on graph 400 by duplicates of the relevant forecasted impression. For example, if forecasted impression $i_n$ is a forecast of a request for network resource A and it is projected that network resource A will request the placement of ten advertisements, then forecasted impression $i_n$ can be duplicated nine times (e.g., $i_{n+1}, i_{n+2} \ldots i_{n+9}$) and those duplicates can be represented on graph 400 with the same edges to the same advertisements as $i_n$.

From this graph of allowable allocations, a disjoint set of solutions can be derived. Accordingly, solution data comprising a first solution set for associating the advertisements with the forecasted impressions and a second solution set for associating the advertisements with the forecasted impressions are generated (306). The first and second solution sets are disjoint solution sets, where the first and second solution sets do not have any common advertisement and forecasted impression associations. In some implementations, the solution data can be defined by a max-flow solution. However, other processes can be used to generate the solution data.

The solution data are represented as a bipartite graph. For example, the association module 218 can generate solution data and store the solution data in the solution data store 224.

For each of a plurality of the forecasted impressions, a first advertisement associated with the forecasted impression from the first solution set and a second advertisement associated with the forecasted impression from the second solution set are identified (308). The forecasted impression is associated with two advertisements that can be allocated to the forecasted impression, each advertisement being from one of the disjoint solution sets. For example, from graph 400, advertisements $a_1, a_2$ and $a_3$ are permitted by the advertisers to be allocated to $i_1$, however, the solution data will identify, at most, two advertisements that can be allocated to $i_1$ (e.g., $a_1$ from the first solution set and $a_3$ from the second solution set, as represented by the bold solid and dashed lines). The association module 218 can, for example, identify a first advertisement associated with the forecasted impression from the first solution set and a second advertisement associated with the forecasted impression from second solution set.

The advertisement allocation system 212 generates forecasting data, identifies advertisement availability data, generates solution data, and identifies first and second advertisements in an offline process prior to the time period relevant to the forecasting data. At run time, the solution data can then be used to determine which advertisements (e.g., the first or second advertisements) to provide in response to impression events as the impressions events occur.

Thus at run time, the first advertisement or second advertisement for an associated forecasted impression is provided in response to an impression event corresponding to the associated forecasted impression (310). The determination of which advertisement to provide is discussed in detail below. For example, the advertisement selection module 220 can provide the first advertisement or second advertisement for an associated forecasted impression in response to an impression event corresponding to the associated forecasted impression.

§2.2 Exemplary Process for Generating Solution Data

Figure 5:
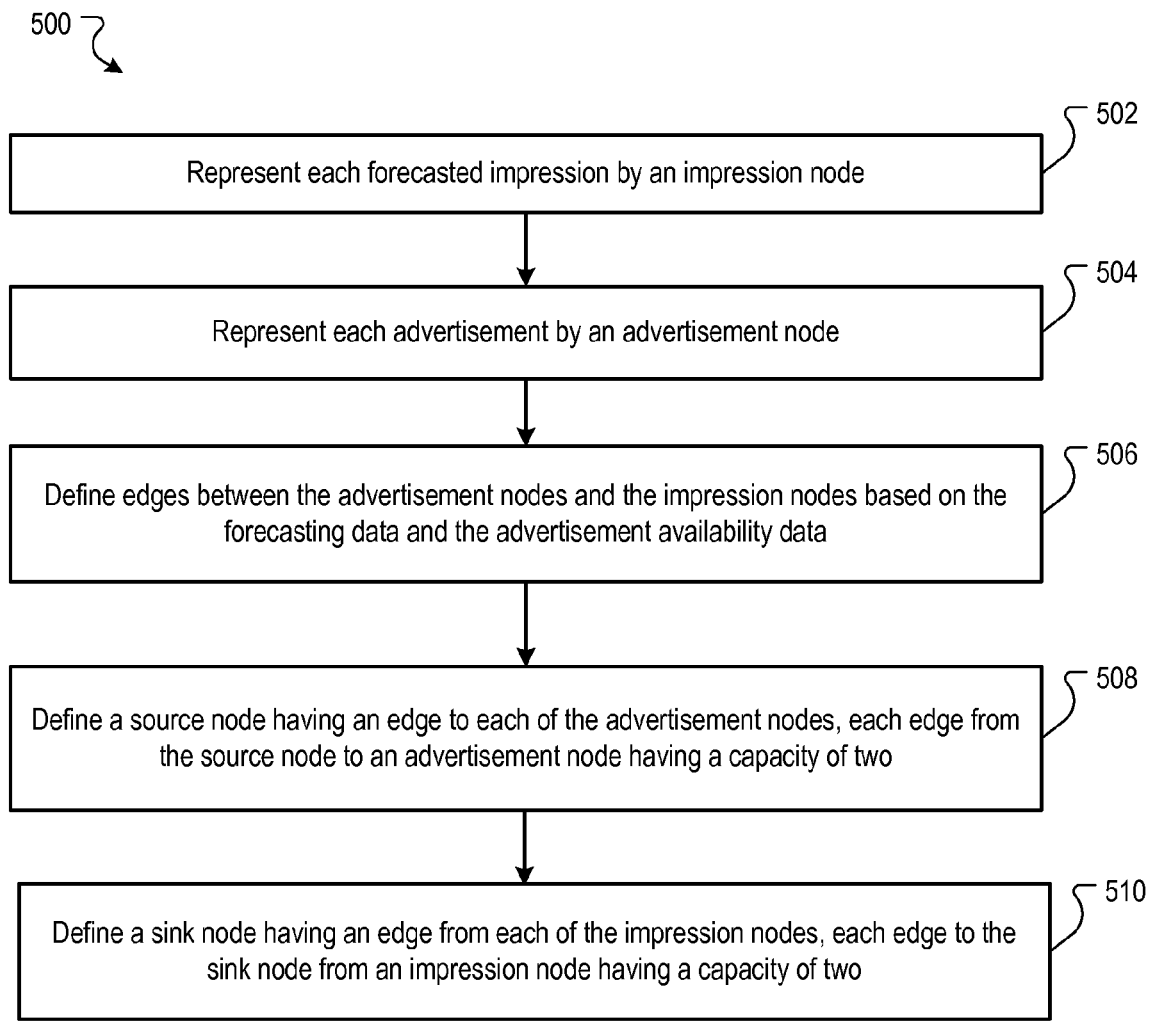
FIG. 5 is a flow diagram of an example process for generating solution data.

FIG. 5 is a flow diagram of an example process 500 for generating solution data. The process can be implemented by the association module 218. The nodes, edges and values described below can all be defined and managed in a computer memory.

Each forecasted impression is represented by an impression node (502). For example, each forecasted impression identified from the forecasting data are represented on a graph by an impression node (or any other data structure or representation that organizes data). The association module 218 can, for example, represent each forecasted impression (e.g., $i_1$-$i_n$ of FIG. 4) by an impression node.

Each advertisement is represented by an advertisement node (504). For example, each advertisement identified from the advertisement availability data are represented on a graph by a advertisement node. The association module 218 can, for example, represent each advertisement (e.g., $a_1$-$a_n$ of FIG. 4) by an advertisement node.

Edges between the advertisement nodes and the impression nodes are defined based on the forecasting data and the advertisement availability data (506). Each edge represents an allowable association between an advertisement node and an impression node. The edges are defined in accord with the advertiser and/or publisher requirements/restrictions discussed above with reference to graph 400.

Depending on the forecasting data and advertisement availability data, not all impression nodes and/or advertisement nodes will have an edge. For example, based on advertiser restrictions/requirements, no advertisements may be allowed to be allocated to a particular forecasted impression. As such, the impression node representing that forecasted impression will not have any edges.

In some implementations, each edge defined between an advertisement node and an impression node has a capacity of one. A capacity defines the number of distinct paths (e.g., solution paths) allowed by an edge during the solution data generation process. The association module 218 can, for example, define edges between the advertisement nodes and the impression nodes.

A source node is defined having an edge to each of the advertisement nodes (508). Each edge from the source node to an advertisement node has a capacity of two. The association module 218 can, for example, define a source node.

A sink node is defined having an edge from each of the impression nodes (510). Each edge to the sink node from an impression node has a capacity of two. The association module 218 can, for example, define a sink node.

The capacities of the edges between the source node and the advertisement nodes and the capacities between the impression nodes and the sink node limit the number of solution sets that can be defined by the solution data. For example, in some implementations, because the relevant capacities of the edges are two, there can be no more than two solution sets. However, if the capacities of the edges between the source/advertisement nodes and impression/sink nodes is k then there can be up to k solution sets.

Figure 6:
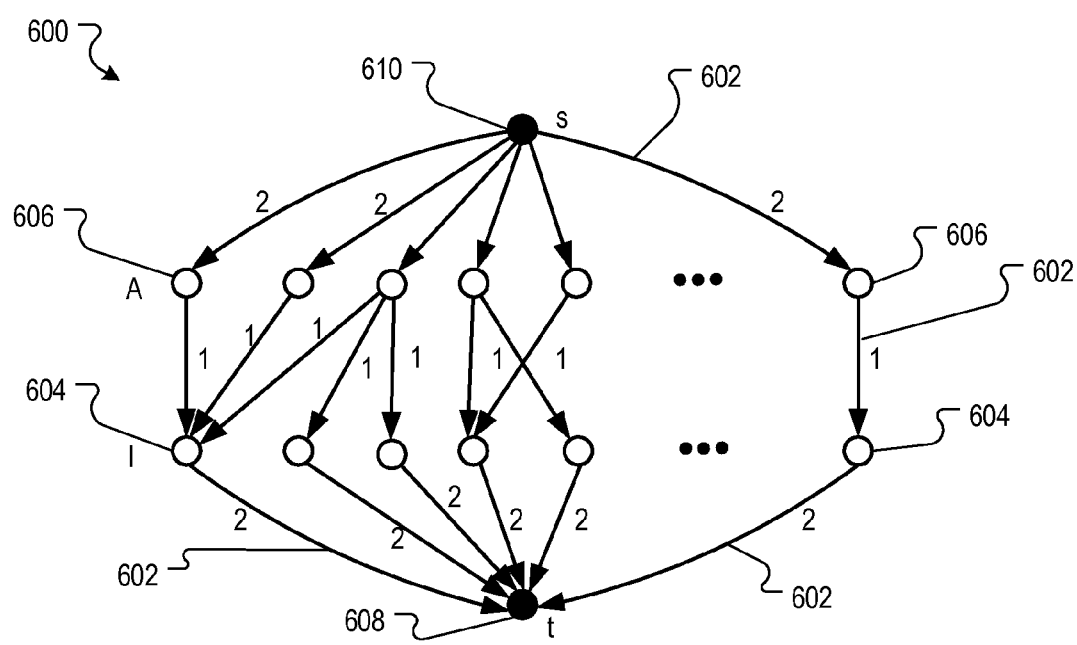
FIG. 6 is an example graph depicting nodes and edges for use in generating the solution data.

FIG. 6 is an example graph 600 depicting nodes and edges for use in generating the solution data. Graph 600 can be generated, for example, according to process 500. Graph 600 depicts impression nodes 604, advertisement nodes 606, sink node 608, source node 610, and edges 602. Graph 600 can be used to generate the solution data, for example, by use of a max flow algorithm (i.e., finding a max flow from the graph 600). In implementations utilizing a max flow algorithm, all edges 602 are assigned a down direction. A down direction is a direction from the source node to an advertisement node, an advertisement node to an impression node, and an impression node to the sink node. Process 500 and graph 600 represent a boosted-flow solution process/problem as the capacities of the edges from the source node 610 to the advertisement nodes 606 are greater than one, and the capacities of the edges from the impression nodes 604 to the sink node 608 are greater than one (the capacities of the edges are "boosted" from a capacity of one).

Once the graph 600 is generated, a variety of max flow algorithms can be used to find the maximal flow f from the source s to the sink t, which is the solution data. Example algorithms include the Ford-Fulkerson algorithm, Edmonds-Karp algorithm, Dinitz blocking flow algorithm, and others.

After the solution data has been generated, for example, by processing the graph 600 according to a max flow algorithm, there will be a collection of solution paths defined by the solution data along the edges between the advertisement nodes and the impression nodes. Each solution path includes one edge between an advertisement node and an impression node (an entire solution path starts at the source node and ends at the sink node). This collection of edges is a proper subset of all of the edges depicted in graph 600 (and defined by process 500). The subset of edges represents both the first and second solutions sets.

In some implementations, a boosted flow solution process/problem (e.g., with reference to FIGS. 5 and 6) may be replaced by a simple flow solution process/problem—all edge capacities in the graph (e.g., graph 600) are one. Generally described, for such implementations, solution sets that are disjoint can be generated by finding a first solution set associating advertisement nodes and impression nodes, removing the edges between the associated advertisement nodes and impression nodes comprising the first solution set, resolving the simple flow process/problem to find a second solution set, removing the edges comprising the second solution set, and so on.

Figure 7:
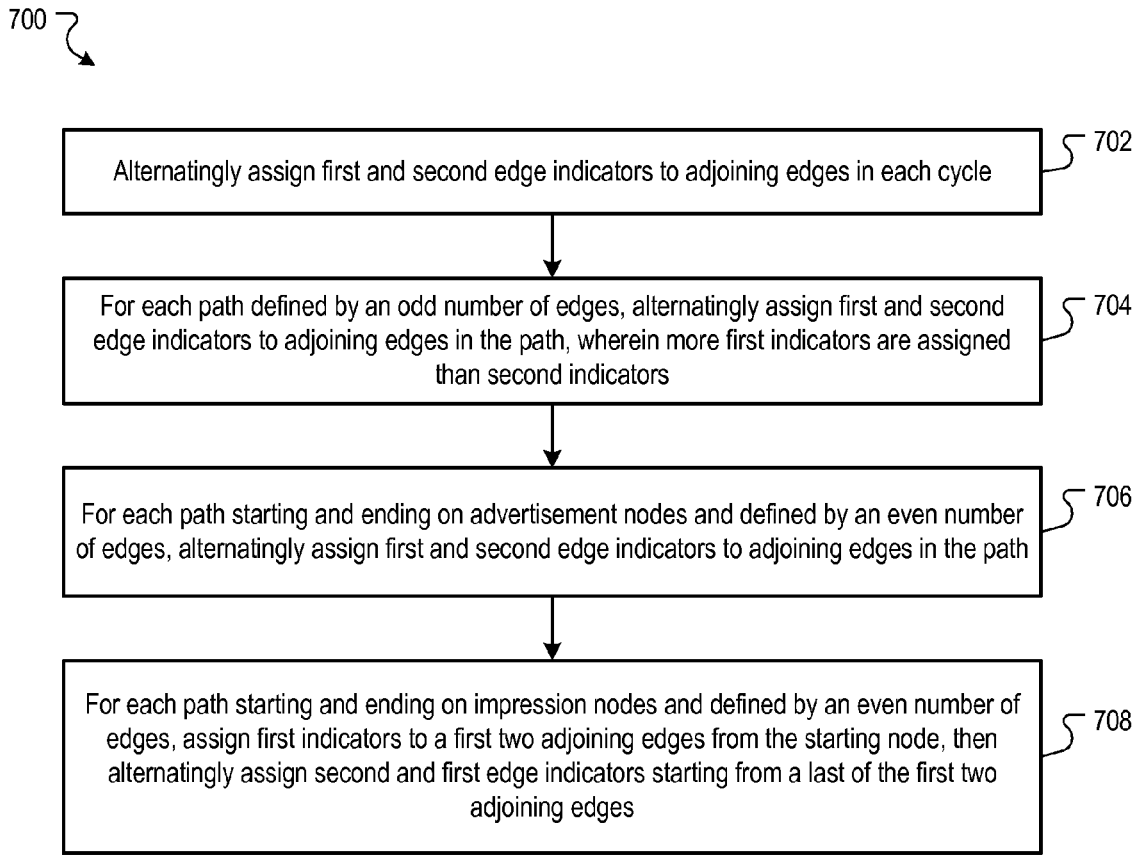
FIG. 7 is a flow diagram of an example process for identifying the first and second solution sets.

FIG. 7 is a flow diagram of an example process 700 for identifying the first and second solution sets. Process 700, for example, can identify which edges in the subset defined by the solution data (e.g., advertisement and forecasted impression associations) belong to which solution sets (i.e., the first and second solution sets). Process 700 can identify first and second solution sets from, for example, solution data generated according to process 500. In some implementations, process 700 assigns first or second edge indicators to each edge in the subset. The first edge indicators collectively define the first solution set and the second edge indicators collectively define the second solution set. Based on the edge indicators a forecasted impression can be associated with two advertisements, each advertisement being one advertisement from each disjoint solution set.

The subset of edges include paths and cycles which can be used to identify edges from each solution set. A cycle is a collection of edges that define a continuous route that starts and ends at the same node (e.g., impression node or advertisement node). A path is a collection of edges that define a continuous route between a starting node and an ending node, where the starting node and ending node are different nodes.

FIGS. 8A-8D are graphs depicting example cycles and paths. Process 700 can be explained in terms of the cycles and paths of graphs 800, 820, 840, and 860 (e.g., the cycles and paths are comprised of the subset of edges defined by the solution data). Specifically, graph 800 depicts an odd-length path, graph 820 depicts a cycle, graph 840 depicts an even-length path starting at an impression node, and graph 860 depicts an even-length path starting at an advertisement node.

First and second edge indicators are alternatingly assigned to adjoining edges in each cycle (702). For example, graph 820 shows that the edge between $a_4$ and $i_4$ is assigned a first edge indicator (e.g., "B"), the edge between $i_4$ and $a_5$ is assigned a second edge indicator (e.g., "R"), and the edge between $a_5$ and $i_5$ is assigned the first edge indicator. This alternating assignment of edge indicators is carried out until all edges in the cycle have been assigned an edge indicator. The association module 218 can, for example, alternatingly assign first and second edge indicators to adjoining edges in each cycle.

For each path defined by an odd number of edges, first and second edge indicators are alternatingly assigned to adjoining edges in the path (704). The edge indicators are assigned so that more first edge indicators are assigned than second edge indicators, e.g., the first edge is always assigned first. For example, graph 800 shows that the edge between $i_1$ and $a_1$ is assigned a first edge indicator (e.g., "B"), the edge between $a_1$ and $i_2$ is assigned a second edge indicator (e.g., "R"), and the edge between $i_2$ and $a_2$ is assigned the first edge indicator. This alternating assignment of edge indicators is carried out until all edges in the path have been assigned and edge indicator. The association module 218 can, for example, alternatingly assign first and second edge indicators to adjoining edges in the path.

For each path starting and ending on advertisement nodes and defined by an even number of edges, first and second edge indicators are alternatingly assigned to adjoining edges in the path (706). For example, graph 860 shows that the edge between $a_{10}$ and $i_{11}$ is assigned a second edge indicator (e.g., "R"), the edge between $i_{11}$ and $a_{11}$ is assigned a first edge indicator (e.g., "B"), and the edge between $a_{11}$ and $i_{12}$ is assigned the second edge indicator. This alternating assignment of edge indicators is carried out until all edges in the path have been assigned an edge indicator. The association module 218 can, for example, alternatingly assign first and second edge indicators to adjoining edges in the path.

For each path starting and ending on impression nodes and defined by an even number of edges, first indicators are assigned to the first two adjoining edges from the starting node and then first and second edge indicators are alternatingly assigned starting from the last of the first two adjoining edges (708). For example, graph 840 shows that the edge between $i_7$ and $a_7$ is assigned a first edge indicator (e.g., "B"), the edge between $a_7$ and $i_8$ is assigned the first edge indicator (the first two adjoining edges), and the edge between $i_8$ and $a_8$ (the edge after the last of the first two adjoining edges) is assigned the second edge indicator (e.g., "R"). This assignment of edge indicators is carried out until all edges in the path have been assigned an edge indicator. The association module 218 can, for example, assign first indicators to a first two adjoining edges from the starting node and alternatingly assign second and first edge indicators starting from (i.e., after) a last of the first two adjoining edges.

Once all of the edges have been assigned an edge indicator, the first and second solution sets can be identified. The first solution set includes advertisement and forecasted impression associations defined by the advertising nodes and the impression nodes connected by edges assigned with first edge indicators (e.g., "B"). The second solution set includes advertisement and forecasted impression associations defined by the advertising nodes and the impression nodes connected by edges assigned with second edge indicators (e.g., "R").

As described above, some impression nodes may not have any edges in the subset, some may have only one edge in the subset assigned with a first indicator, or some may have two edges in the subset, one assigned with a first indicator and one assigned with a second indicator. Thus not all forecasted impressions have two advertisements allocated to them. For example, in FIG. 8A the forecasted impression represented by impression node $i_1$ only has one advertisement allocated to it, i.e., the advertisement represented by advertisement node $a_1$. If the advertisement represented by $a_1$ has been provided in response to an impression event corresponding to $i_2$ then an advertisement may not be provided in response to an impression event corresponding to forecasted impression $i_1$.

With reference to FIGS. 7 and 8, a process for identifying (decomposing) from solution data two solution sets that are disjoint has been described. However, as described above, solution data may have k solution sets—as determined by particular edge capacities. The processes of repeatedly finding flow solutions as described above can also be used to find k solution sets. Alternatively, to decompose such solution data to k solution sets that are disjoint, edge-coloring algorithms of bipartite graphs such as, for example, the Konig-Hall algorithm or the Hoperoft-Cole algorithm can be used. In such coloring algorithms, it is important to choose larger set of edges for the solutions with higher priority.

As, in some implementations, an advertisement can be associated with two forecasted impressions, and a forecasted impression can be associated with two advertisements, it is possible for an impression event corresponding to a first forecasted impression that one of the two advertisements associated with the first forecasted impression may have been previously provided in response to an impression event corresponding to a second forecasted impression. In such a scenario, the other of the two advertisements associated with the first forecasted impression can be provided in response to the impression event. Process 900 of FIG. 9 provides one example method for determining which advertisements to provide.

Figure 9:
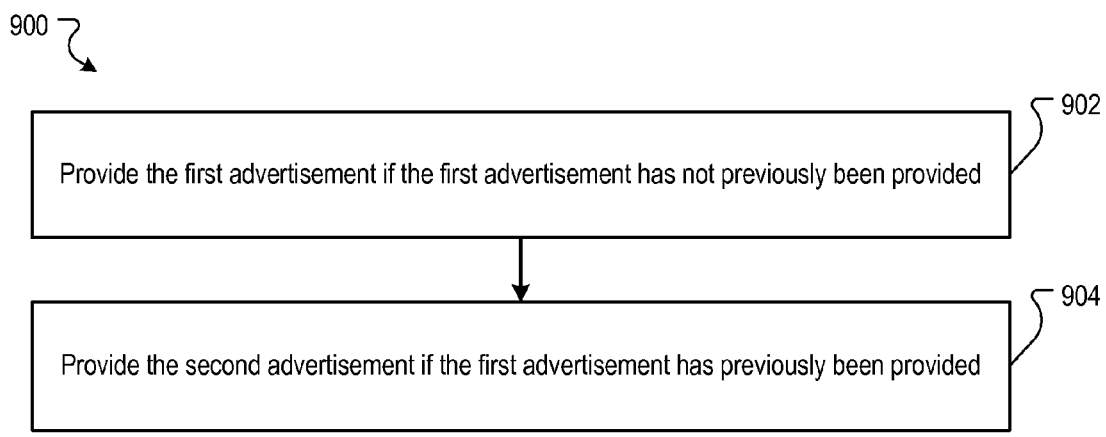
FIG. 9 is a flow diagram of an example process for providing advertisements in response to an impression event.
Figures 8A, 8B, 8C:
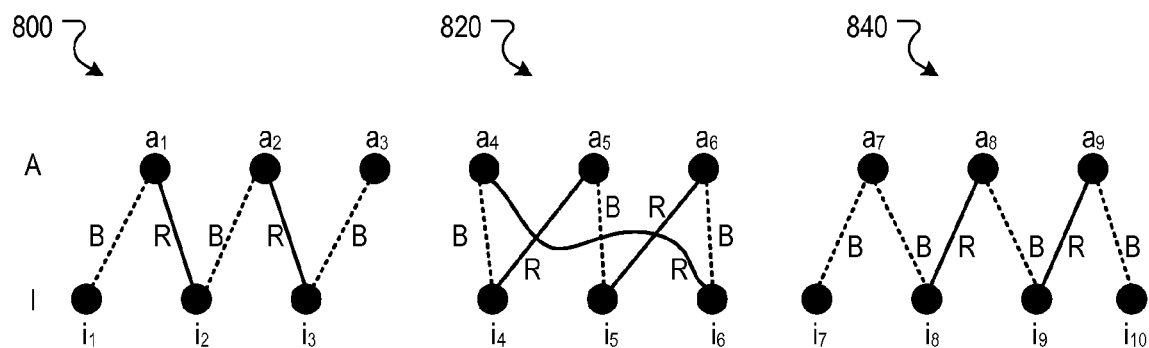
FIGS. 8A-8D are graphs depicting example cycles and paths.
Figure 8D:
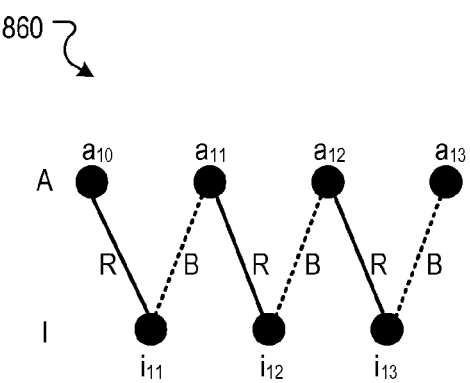

FIG. 9 is a flow diagram of an example process 900 for providing advertisements in response to an impression event. After the solution data has been generated, process 900 can leverage the solution data to determine which advertisements should be allocated to impression events as the impressions events occur. The process 900 can be implemented in the advertisement selection module 220.

For an impression event corresponding to a forecasted impression, a first advertisement from a first advertisement and forecasted impression association for the forecasted impression is provided if the first advertisement has not previously been provided for another forecasted impression (902). For a particular impression node corresponding to a received impression event, a first advertisement corresponding to an advertisement node with an edge (assigned a first edge indicator) to the impression node is selected and provided in response to the impression event so long as the first advertisement has not already been provided. The advertisement selection module 220 can, for example, provide the first advertisement.

The second advertisement from a second advertisement and forecasted impression association for the forecasted impression is provided if the first advertisement has previously been provided (904). For a particular impression node corresponding to a received impression event, a second advertisement corresponding to an advertisement node with an edge (assigned a second edge indicator) to the impression node is selected and provided in response to the impression event if the first advertisement has already been provided. For example, the advertisement selection module 220 can provide the second advertisement.

Thus when an impression event is received, either the first advertisement from a corresponding advertisement and forecasted impression association in the first solution set or second advertisement from a corresponding advertisement and forecasted impression association in the second solution set can be provided in response. Advantageously, the first solution set is disjoint to the second solution set. Because the first and second advertisements are from disjoint solution sets, the allocations for advertisements to forecasted impressions do not overlap between the two solution sets. As such, the solution data, generated in an offline process, can be used to guide the selection of advertisements for particular impression events during an online process.

If more than two solution sets are generated (e.g., by any of the processes described above), then the group of advertisements allocated to a forecasted impression corresponding to a received impression event can be provided according to some predetermined order. For example, three disjoint solutions sets may be defined by the solution data so that each forecasted impression is associated with an advertisement from each of the three sets (e.g., three advertisements are allocated to the forecasted impression). Three disjoint solutions may be generated by, for example, setting the capacities of the edges between the source/advertisement nodes and impression/sink nodes to three. Thus if an impression event corresponding to a forecasted impression is received then the first of the associated advertisements can be provided if the first advertisement has not previously been provided. If the first advertisement has already been provided then the second advertisement can be provided if it has not been previously provided. If the second advertisement has already been provided then the third advertisement can be provided if it has not been previously provided, and so on.

§3.0 Example Processing System

Figure 10:
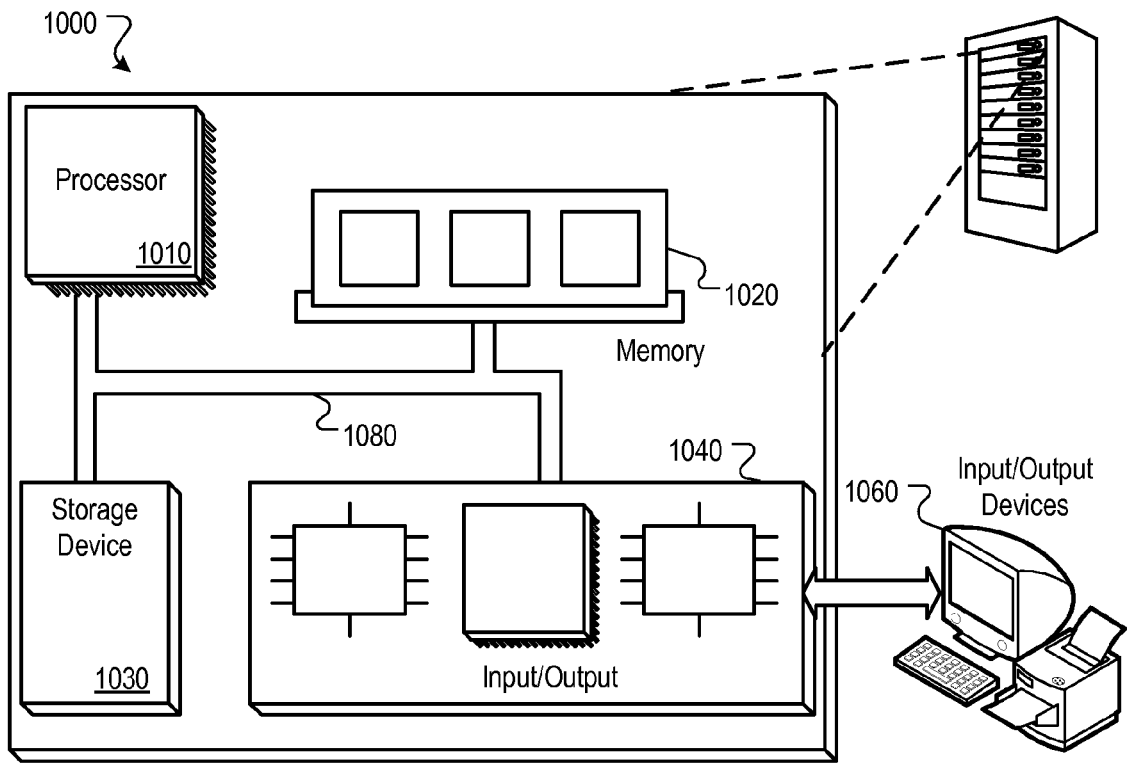
FIG. 10 is block diagram of an example computer system.

FIG. 10 is block diagram of an example computer processing system 1000 that can be used to allocate and provide advertisements in response to impression events corresponding to forecasted impressions based on forecasting data and advertisement availability data. The system 1000 can be used to realize a variety of different types of computer devices, such as the client devices 208 or server and computer devices on which the advertising system 204 and the advertisement allocation system 212 are implemented.

The system 1000 includes a processor 1010, a memory 1020, a storage device 1030, and an input/output device 1040. Each of the components 1010, 1020, 1030, and 1040 can, for example, be interconnected using a system bus 1080. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 1000. In one implementation, the storage device 1030 is a computer-readable medium. In various different implementations, the storage device 1030 can, for example, include a hard disk device, an optical disk device, or some other large capacity storage device.

The input/output device 1040 provides input/output operations for the system 1000. In one implementation, the input/output device 1040 can include one or more of a network interface devices, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 1060. Other implementations, however, can also be used, such as mobile computing devices, mobile communication devices, etc.

Although an example processing system has been described in FIG. 10, embodiments of the subject matter and the functional operations described in this specification can be implemented in other digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine readable storage device, a machine readable storage substrate, a memory device, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying Figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
identifying forecasting data defining forecasted impressions for a given time period;
identifying advertisement availability data defining availabilities of advertisements to be provided during the time period;
generating by a computer system solution data comprising:
a first solution set associating the advertisements with the forecasted impressions, the first solution set being a set of advertisement-forecasted impression pairs, wherein each advertisement-forecasted impression pair in the first solution set is an association of one advertisement and one forecasted impression, and
a second solution set associating the advertisements with the forecasted impressions, the second solution set being a set of advertisement-forecasted impression pairs, wherein each advertisement-forecasted impression pair in the second solution set is an association of one advertisement and one forecasted impression,
wherein the first and second solution sets are disjoint solution sets with respect to the advertisement-forecasted impression pairs where the first and second solution sets do not have any common advertisement-forecasted impression pairs;
for each of a plurality of the forecasted impressions:
identifying by the computer system a first advertisement associated with the forecasted impression from the advertisement-forecasted impression pair in the first solution set that includes the forecasted impression, and a second advertisement associated with the forecasted impression from the advertisement-forecasted impression pair in the second solution set that includes the forecasted impression; and
providing the first advertisement or second advertisement for the forecasted impression in response to an impression event corresponding to the forecasted impression.

2. The method of claim 1, wherein generating solution data comprises generating a max-flow solution defining the solution data.

3. The method of claim 2, wherein generating solution data comprises:
representing each of the forecasted impressions by an impression node;
representing each of the advertisements by an advertisement node;
defining edges between the advertisement nodes and the impression nodes based on the forecasting data and the advertisement availability data, each edge between an advertisement node and an impression node having a capacity of one;
defining a source node having an edge to each of the advertisement nodes, each edge from the source node to an advertisement node having a capacity of two; and
defining a sink node having an edge from each of the impression nodes, each edge to the sink node from an impression node having a capacity of two.

4. The method of claim 3, wherein generating the solution data by use of a max-flow solution process comprises identifying a proper subset of the edges defined between the advertisement nodes and the impression nodes.

5. The method of claim 4, comprising: assigning first and second edge indicators to the subset of the edges, the first edge indicators collectively defining the first solution set and the second edge indicators collectively defining the second solution set.

6. The method of claim 5, wherein:
the subset of the edges comprises one or more paths and one or more cycles, a cycle being a collection of edges defining a continuous route that starts and ends at a same node, and a path being a collection of edges defining a continuous route between a starting node and ending where the starting node and ending node are different nodes;
wherein the subset of edges comprises:
one or more paths with an odd number of edges;
one or more paths starting and ending on advertisement nodes and defined by an even number of edges; and
one or more paths starting and ending on impression nodes and defined by an even number of edges; and
assigning first and second edge indicators to the subset of the edges comprises:
alternatingly assigning first and second edge indicators to adjoining edges in each cycle;
for each path defined by an odd number of edges, alternatingly assigning first and second edge indicators to adjoining edges in the path, wherein more first indicators are assigned than second indicators;
for each path starting and ending on advertisement nodes and defined by an even number of edges, alternatingly assigning first and second edge indicators to adjoining edges in the path; and
for each path starting and ending on impression nodes and defined by an even number of edges:
assigning first indicators to a first two adjoining edges from the starting node; and
then alternatingly assigning second and first edge indicators starting from a last of the first two adjoining edges.

7. The method of claim 6, wherein providing the first advertisement or second advertisement for an associated forecasted impression in response to an impression event corresponding to the forecasted impression comprises:

determining that the first advertisement has not previously been provided during the time period; and providing the first advertisement in response to determining that the first advertisement has not previously been provided during the time period.

8. The method of claim 6, wherein providing the first advertisement or second advertisement for an associated forecasted impression in response to an impression event corresponding to the forecasted impression comprises:

determining that the first advertisement has previously been provided during the time period; and providing the second advertisement in response to determining that the first advertisement has previously been provided during the time period.

9. The method of claim 1, wherein the solution data comprise a bipartite graph.

10. A system, comprising:

one or more data processors; and software stored on a computer storage apparatus and comprising instructions executable by the one or more data processors and upon such execution cause the one or more data processors to define:

a forecasting module configured to:

identify forecasting data defining forecasted impressions for a given time period;

identify advertisement availability data defining availabilities of advertisements to be provided during the time period;

an association module configured to:

generate solution data comprising:

a first solution set associating the advertisements with the forecasted impressions, the first solution set being a set of advertisement-forecasted impression pairs, wherein each advertisement-forecasted impression pair in the first solution set is an association of one advertisement and one forecasted impression, and a second solution set associating the advertisements with the forecasted impressions, the second solution set being a set of advertisement-forecasted impression pairs, wherein each advertisement-forecasted impression pair in the second solution set is an association of one advertisement and one forecasted impression, wherein the first and second solution sets are disjoint solution sets with respect to the advertisement-forecasted impression pairs where the first and second solution sets do not have any common advertisement-forecasted impression pairs;

for each of a plurality of the forecasted impressions, identify a first advertisement associated with the forecasted impression from the advertisement-forecasted impression pair in the first solution set that includes the forecasted impression and a second advertisement associated with the forecasted impression from the advertisement-forecasted impression pair in the second solution set that includes the forecasted impression; and an advertisement selection module configured to provide the first advertisement or second advertisement for the forecasted impression in response to an impression event corresponding to the forecasted impression.

11. The system of claim 10, wherein the association module is configured to generate a max-flow solution defining the solution data.

12. The system of claim 11, wherein the association module is configured to:

represent each of the forecasted impressions by an impression node;

represent each of the advertisements by an advertisement node;

define edges between the advertisement nodes and the impression nodes based on the forecasting data and the advertisement availability data, each edge between an advertisement node and an impression node having a capacity of one;

define a source node having an edge to each of the advertisement nodes, each edge from the source node to an advertisement node having a capacity of two; and define a sink node having an edge from each of the impression nodes, each edge to the sink node from an impression node having a capacity of two.

13. The system of claim 12, wherein the association module is configured to identify a proper subset of the edges defined between the advertisement nodes and the impression nodes.

14. The system of claim 13, wherein the association module is configured to assign first and second edge indicators to the subset of the edges, the first edge indicators collectively defining the first solution set and the second edge indicators collectively defining the second solution set.

15. The system of claim 14, wherein:

the subset of the edges comprises paths and cycles, a cycle being a collection of edges defining a continuous route that starts and ends at a same node, and a path being a collection of edges defining a continuous route between a starting node and ending where the starting node and ending node are different nodes;

wherein the subset of edges comprises:

one or more paths with an odd number of edges;

one or more paths starting and ending on advertisement nodes and defined by an even number of edges; and one or more paths starting and ending on impression nodes and defined by an even number of edges; and the association module is configured to:

alternatingly assigning first and second edge indicators to adjoining edges in each cycle;

for each path defined by an odd number of edges, alternatingly assign first and second edge indicators to adjoining edges in the path, wherein more first indicators are assigned than second indicators;

for each path starting and ending on advertisement nodes and defined by an even number of edges, alternatingly assign first and second edge indicators to adjoining edges in the path; and for each path starting and ending on impression nodes and defined by an even number of edges:

assign first indicators to a first two adjoining edges from the starting node; and then alternatingly assign second and first edge indicators starting from a last of the first two adjoining edges.

16. The system of claim 15, wherein the advertisement selection module is configured to:

determine that the first advertisement has not previously been provided during the time period; and provide the first advertisement in response to determining that the first advertisement has not previously been provided during the time period.

17. The system of claim 10, wherein the solution data comprise a bipartite graph.

18. One or more non-transitory computer readable media storing instructions executable by a processing system, and upon such execution cause the processing system to perform operations comprising:

identifying forecasting data defining forecasted impressions for a given time period;

identifying advertisement availability data defining availabilities of advertisements to be provided during the time period;

generating solution data comprising:

a first solution set associating the advertisements with the forecasted impressions, the first solution set being a set of advertisement-forecasted impression pairs, wherein each advertisement-forecasted impression pair in the first solution set is an association of one advertisement and one forecasted impression, and a second solution set associating the advertisements with the forecasted impressions, the second solution set comprising advertisement-forecasted impression pairs, wherein each advertisement-forecasted impression pair in the second solution set is an association of one advertisement and one forecasted impression, wherein the first and second solution sets are disjoint solution sets with respect to the advertisement-forecasted impression pairs where the first and second solution sets do not have any common advertisement-forecasted impression pairs;

for each of a plurality of the forecasted impressions, identifying by the computer system a first advertisement associated with the forecasted impression from the advertisement-forecasted impression pair in the first solution set that includes the forecasted impression and a second advertisement associated with the forecasted impression from the advertisement-forecasted impression pair in the second solution set that includes the forecasted impression; and providing the first advertisement or second advertisement for the forecasted impression in response to an impression event corresponding to the forecasted impression.

19. The one or more non-transitory computer readable media of claim 18, wherein generating solution data comprises:

representing each of the forecasted impressions by an impression node;

representing each of the advertisements by an advertisement node;

defining edges between the advertisement nodes and the impression nodes based on the forecasting data and the advertisement availability data, each edge between an advertisement node and an impression node having a capacity of one;

defining a source node having an edge to each of the advertisement nodes, each edge from the source node to an advertisement node having a capacity of two; and defining a sink node having an edge from each of the impression nodes, each edge to the sink node from an impression node having a capacity of two.

20. The one or more non-transitory computer readable media of claim 19, wherein generating the solution data comprises identifying a proper subset of the edges defined between the advertisement nodes and the impression nodes.

21. The one or more non-transitory computer readable media of claim 20, comprising:

assigning first and second edge indicators to the subset of the edges, the first edge indicators collectively defining the first solution set and the second edge indicators collectively defining the second solution set.

22. The one or more non-transitory computer readable media of claim 18, comprising:

representing each of the forecasted impressions by an impression node;

representing each of the advertisements by an advertisement node;

defining edges between the advertisement nodes and the impression nodes based on the forecasting data and the advertisement availability data, each edge between an advertisement node and an impression node having a capacity of one;

defining a source node having an edge to each of the advertisement nodes, each edge from the source node to an advertisement node having a capacity of one; and defining a sink node having an edge from each of the impression nodes, each edge to the sink node from an impression node having a capacity of one.

23. The one or more non-transitory computer readable media of claim 22, wherein generating the solution data comprises iteratively identifying solution sets associating advertisement nodes and impression nodes, wherein at least two solutions sets are identified and each of the solution sets is disjoint to the other solution sets; and after each of the at least two solution sets has been identified, removing the edges between the associated advertisement nodes and forecasted impression nodes comprising the solution set.

* * * * *